(12) United States Patent
Moki et al.

(10) Patent No.: US 11,619,926 B2
(45) Date of Patent: *Apr. 4, 2023

(54) INFORMATION PROCESSING DEVICE, PROGRAM, PROCESS TREATMENT EXECUTING DEVICE, AND INFORMATION PROCESSING SYSTEM

(71) Applicant: Tokyo Electron Limited, Tokyo (JP)

(72) Inventors: Hironori Moki, Hokkaido (JP); Takahiko Kato, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,023

(22) Filed: Dec. 27, 2021

(65) Prior Publication Data

US 2022/0121176 A1 Apr. 21, 2022

Related U.S. Application Data

(63) Continuation of application No. 16/966,979, filed as application No. PCT/JP2019/002756 on Jan. 28, 2019, now Pat. No. 11,237,544.

(30) Foreign Application Priority Data

Feb. 8, 2018 (JP) .............................. JP2018-021058

(51) Int. Cl.
*G05B 19/4155* (2006.01)
*G05B 19/418* (2006.01)

(52) U.S. Cl.
CPC ... *G05B 19/4155* (2013.01); *G05B 19/41875* (2013.01); *G05B 2219/45031* (2013.01)

(58) Field of Classification Search
None
See application file for complete search history.

(56) References Cited

U.S. PATENT DOCUMENTS 11,237,544 B2 * 2/2022 Moki .................... G06Q 10/04

FOREIGN PATENT DOCUMENTS

| JP | 2002-208544 | 7/2002 |
| JP | 2010-282636 | 12/2010 |
| JP | 2016-512641 | 4/2016 |
| JP | 2016-143794 | 8/2016 |

(Continued)

*Primary Examiner* — Ryan A Jarrett
(74) *Attorney, Agent, or Firm* — IPUSA, PLLC

(57) ABSTRACT

An information processing device includes: a recording means storing model data that reproduces a change of a workpiece, the model data being constructed, as an effect of process treatment, from differential data between initial state data and end state data of the workpiece, the end state data representing state of the workpiece to which the process treatment is applied under a predetermined process condition; an input receiving means for receiving an input of the initial state data and target end state data of the workpiece; a predicting means for predicting the end state data from the received initial state data, by using the model data and a combination of multiple model data in the recording means; and a determining means for determining a process condition of process treatment to be applied to the workpiece, based on a proximity between the predicted end state data and the target end state data.

12 Claims, 13 Drawing Sheets

(56) References Cited

FOREIGN PATENT DOCUMENTS

| JP | 2017-135365 | 8/2017 |
| WO | 2005/106932 | 11/2005 |
| WO | 2011/158339 | 12/2011 |
| WO | 2016/047118 | 3/2016 |

* cited by examiner

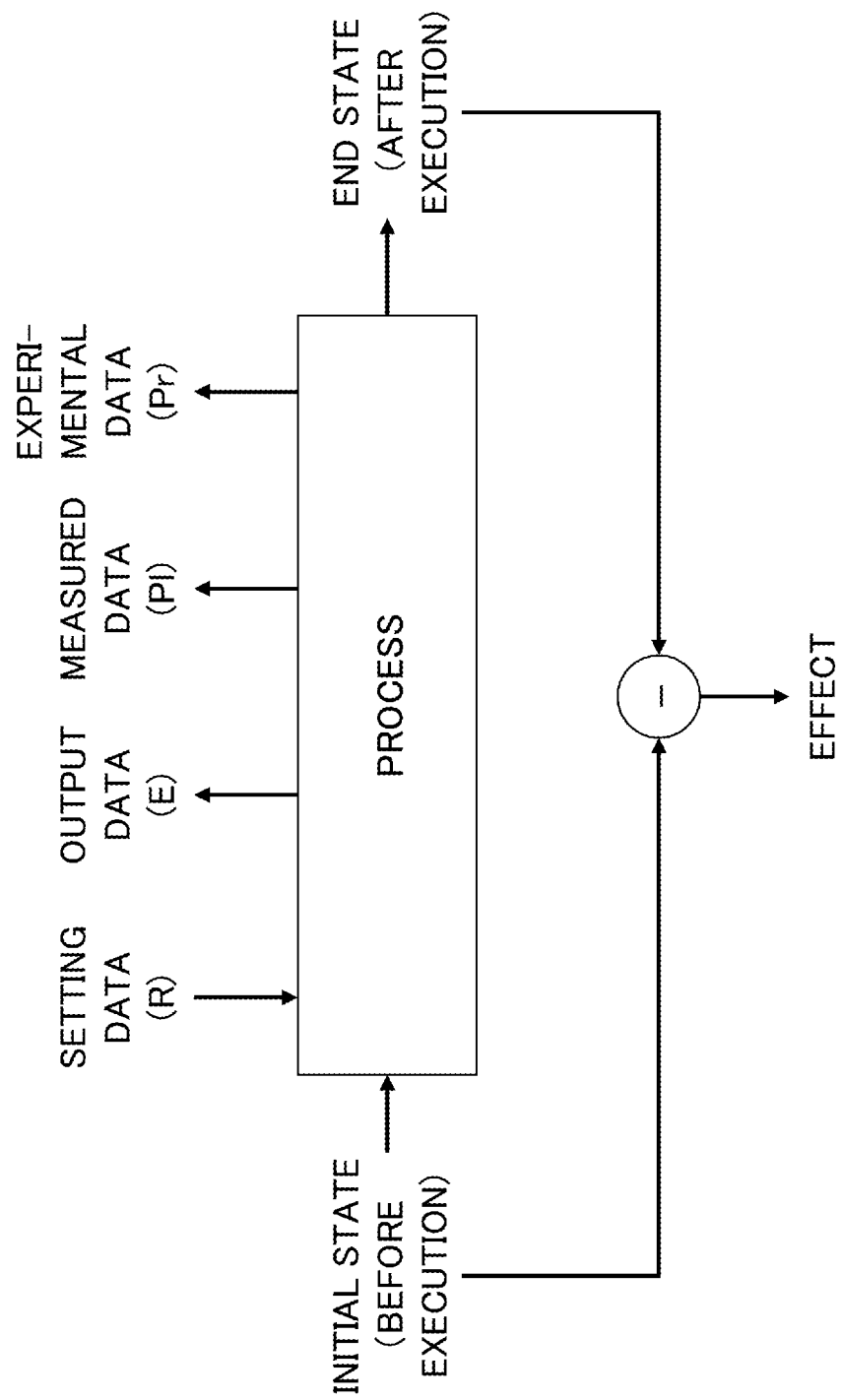

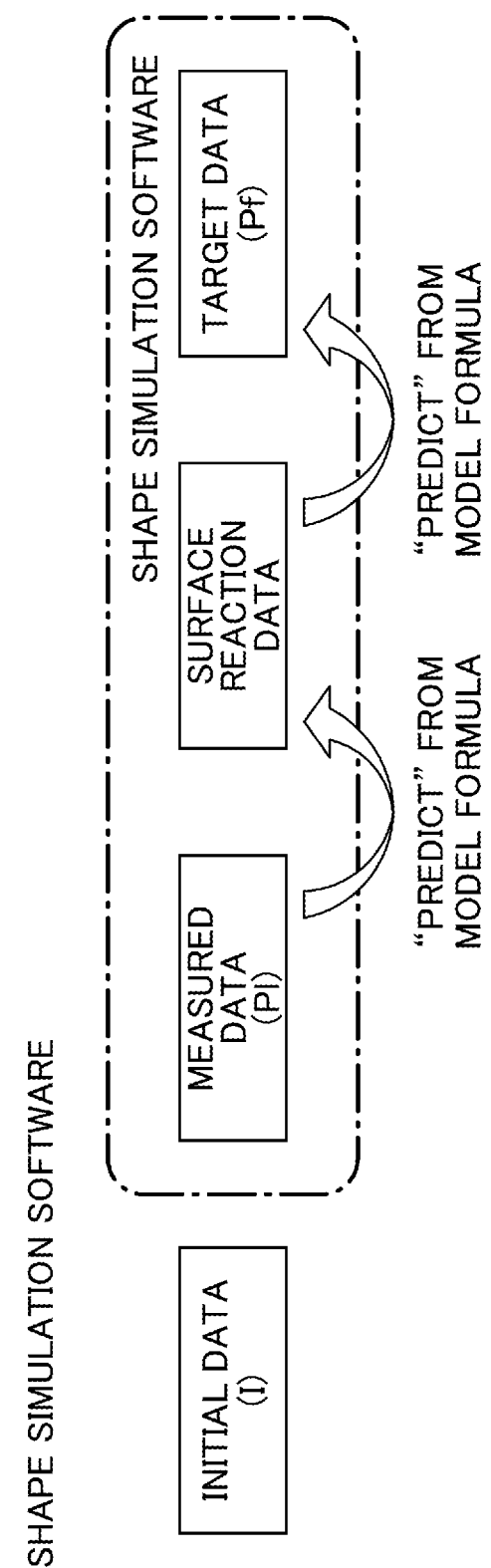

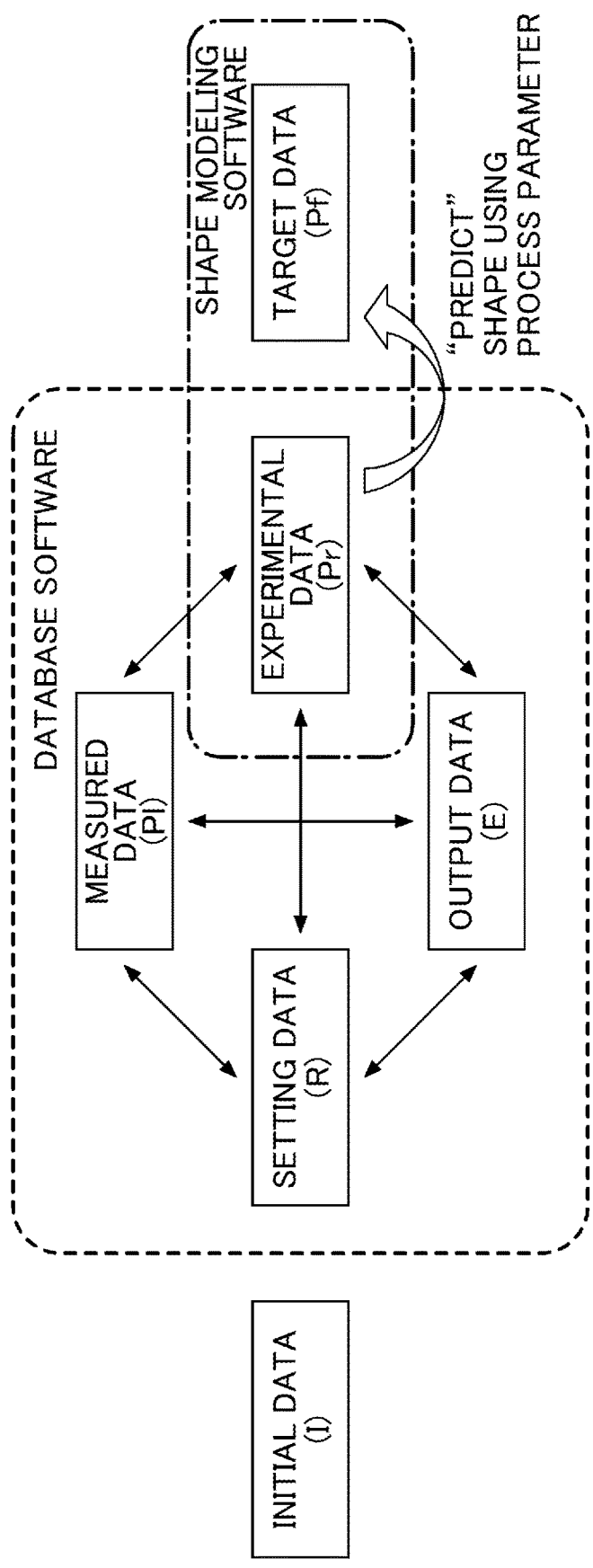

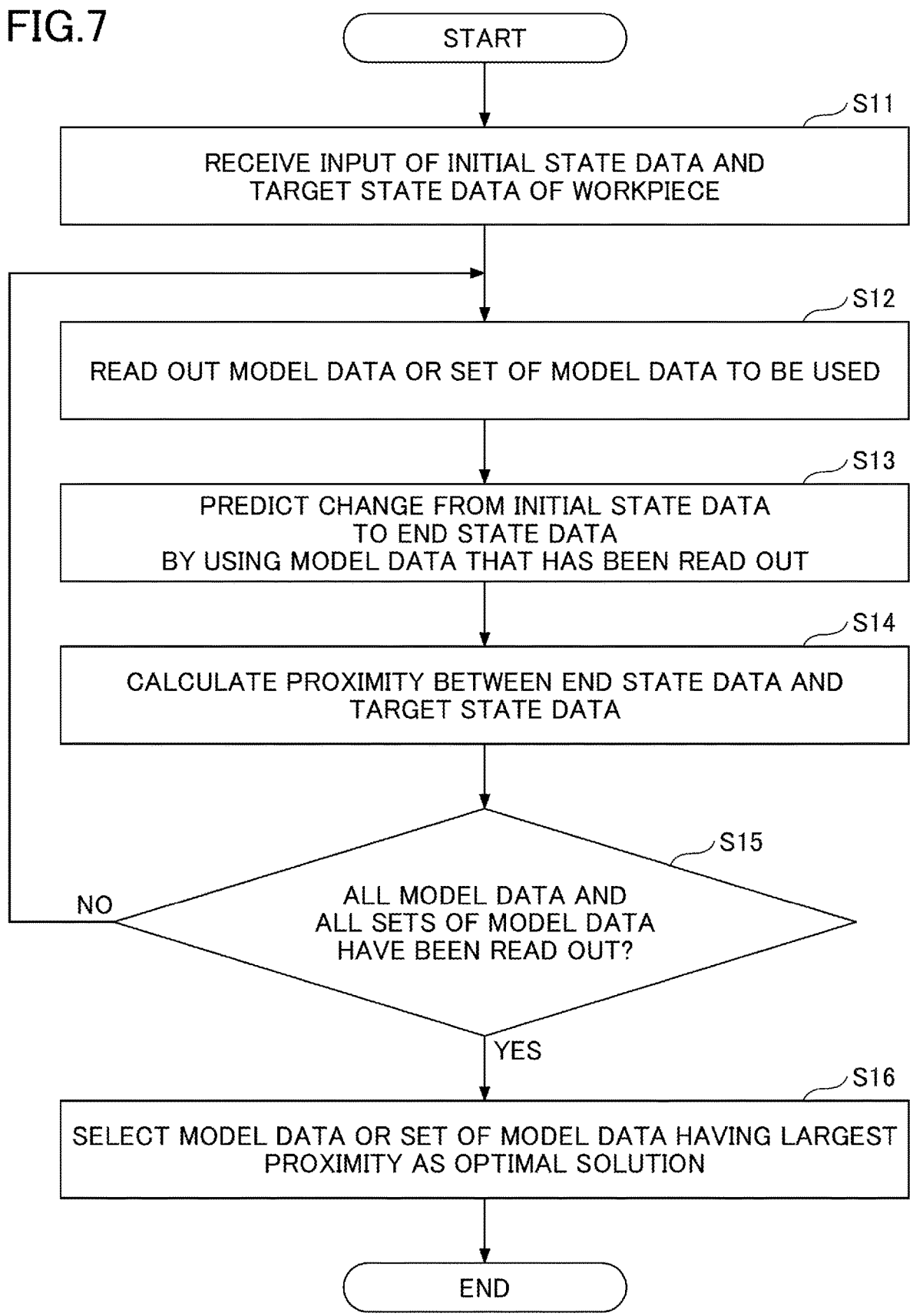

INFORMATION PROCESSING DEVICE, PROGRAM, PROCESS TREATMENT EXECUTING DEVICE, AND INFORMATION PROCESSING SYSTEM

CROSS-REFERENCE TO RELATED APPLICATIONS

This application is a continuation of U.S. patent application Ser. No. 16/966,979 filed on Aug. 3, 2020, which is a national stage application of International Patent Application No. PCT/JP2019/002756 filed on Jan. 28, 2019, which is based on and claims priority to Japanese Patent Application No. 2018-21058 filed on Feb. 8, 2018. The entire contents of these applications are hereby incorporated by reference.

BACKGROUND OF THE INVENTION

1. Field of the Invention

The present invention relates to an information processing device, a program, a process treatment executing apparatus, and an information processing system.

2. Description of the Related Art

In conventional semiconductor manufacturing apparatuses, forming or surface treatment has been made by performing a semiconductor manufacturing process, whose conditions are described as setting values of control components that constitute the semiconductor manufacturing apparatus.

For example, a method of generating process values of one or more input variables governing a plasma process sequence, from a final model and a desired surface profile, has been known (see Patent Document 1, for example).

Also, there is known a method of optimizing a computerized model in which multiple model parameters are used to associate an etched feature profile on a semiconductor device with a set of input independent parameters (see Patent Document 2, for example).

However, in a conventional semiconductor manufacturing apparatus, for the purpose of obtaining desired shape processing and surface treatment, a semiconductor manufacturing process has been performed under a condition described by using setting values (control setting values) for control components constituting the semiconductor manufacturing apparatus. That is, the semiconductor manufacturing process has been controlled with the control setting values that are not direct to the purpose. Controlling the semiconductor manufacturing process with control setting values that are not direct to the purpose has been a problem in that it slows down the development of devices. Such a problem arises not only in a semiconductor manufacturing apparatus, but also in a process treatment executing device in which process treatment is applied to a workpiece under a predetermined process condition to change the workpiece.

An embodiment of the present invention is intended to provide an information processing device capable of determining a predetermined process condition of process treatment to be applied to a workpiece by inputting initial state data of the workpiece and target end state data of the workpiece.

RELATED ART DOCUMENTS

Patent Documents

[Patent Document 1] Japanese Laid-open Patent Application Publication No. 2010-282636
[Patent Document 2] Japanese Laid-open Patent Application Publication No. 2017-135365

SUMMARY OF THE INVENTION

According to an embodiment, an information processing device includes: a recording means configured to store a model data element that reproduces a change of a workpiece, the model data being constructed, as an effect of process treatment, from differential data between initial state data of the workpiece and end state data of the workpiece, the end state data being state data of the workpiece to which the process treatment is applied under a predetermined process condition; an input receiving means configured to receive an input of the initial state data of the workpiece and target end state data of the workpiece; a predicting means configured to predict the end state data of the workpiece from the initial state data of the workpiece received by the input receiving means, by using the model data element and a combination of multiple model data elements that is recorded in the recording means; and a determining means configured to determine a predetermined process condition of process treatment to be applied to the workpiece, based on a proximity between the predicted end state data of the workpiece and the target end state data of the workpiece received by the input receiving means.

According to at least one embodiment, the predetermined process conditions of the process treatment to be applied to a workpiece can be determined by inputting the initial state data of the workpiece and the target end state data of the workpiece.

BRIEF DESCRIPTION OF THE DRAWINGS

FIG. 5 is an explanatory diagram illustrating an example of a process for calculating an effect of the semiconductor manufacturing process treatment;
FIG. 6A is an explanatory diagram illustrating an example of a method for predicting change in state data of a workpiece;
FIG. 6B is an explanatory diagram illustrating an example of a method for predicting change in state data of a workpiece;
FIG. 7 is a flowchart illustrating an example of a process performed in a server apparatus.

DESCRIPTION OF THE PREFERRED EMBODIMENTS

Hereinafter, embodiments of the present invention will be described with reference to the drawings. In the present embodiment, as an example of a process treatment executing device that applies process treatment to a workpiece, an example of a semiconductor manufacturing apparatus that applies semiconductor manufacturing process treatment to a workpiece will be described.

First Embodiment

<System Configuration>

Figure 1:
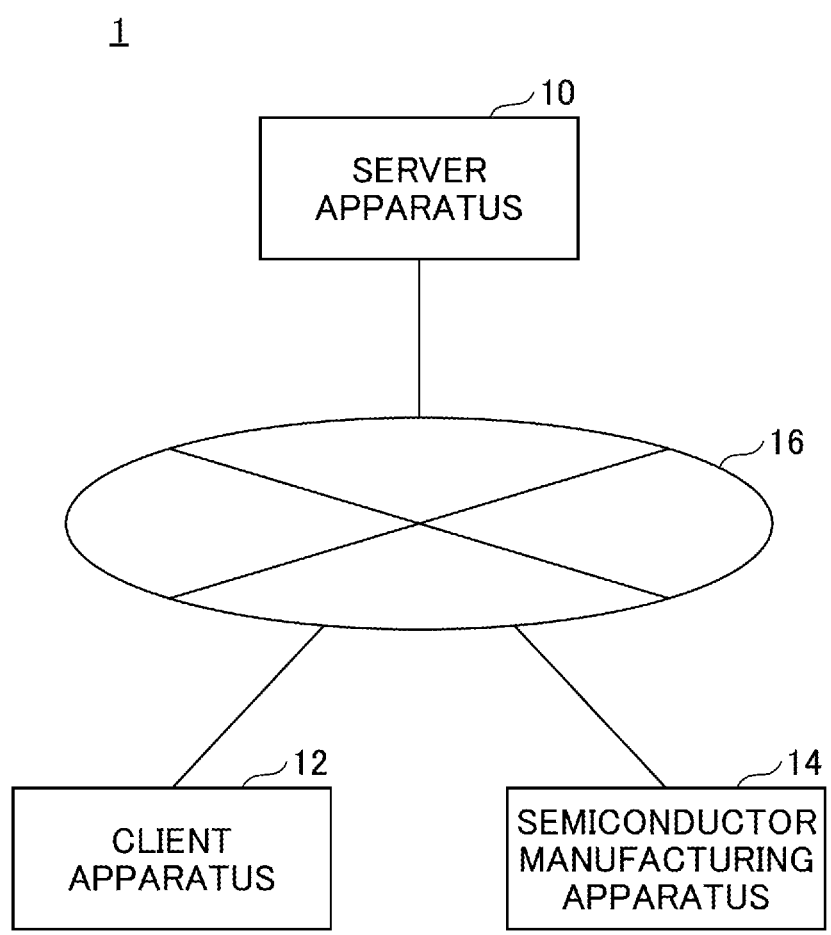
FIG. 1 is a block diagram illustrating an example of an information processing system according to a first embodiment.

FIG. 1 is a block diagram illustrating an example of an information processing system according to a first embodiment. In the information processing system 1 of FIG. 1, a server apparatus 10, a client apparatus 12, and a semiconductor manufacturing apparatus 14 are communicatively connected via a network 16 such as the Internet or a local area network (LAN).

The client apparatus 12 is an example of a device operated by a user. The client apparatus 12 receives, from the user, an input of initial state data and target state data, which will be described below, and which are necessary for the server apparatus 10 to execute processing, and transmits the initial state data and the target state data to the server apparatus 10. The client apparatus 12 also receives and displays results of the processing performed in the server apparatus 10.

The server apparatus 10 uses various model data elements to be described below, each of which reproduces change of a workpiece and is constructed as an effect of semiconductor manufacturing process treatment, to determine a model data element or a combination of multiple model data elements, from which a result close to the target state data input from the client apparatus 12 can be obtained. The model data element may be stored in the server apparatus 10 in advance, or may be stored in another device which is readable by the server apparatus 10 through the network 16.

The server apparatus 10 selects, as an optimal solution, a model data element or a combination of the multiple model data elements, to be described below, which changes the initial state data to end state data having a high degree of proximity to the target state data input from the client apparatus 12. The server apparatus 10 determines setting data (recipe parameters) included in the model data element selected as the optimal solution, as setting values (control setting values) of control components constituting the semiconductor manufacturing apparatus.

The server apparatus 10 may output the determined control setting values to the client apparatus 12, to display the control setting values on the client apparatus 12. The server apparatus 10 may also output the determined control setting values to the semiconductor manufacturing apparatus 14, to control semiconductor manufacturing process treatment performed by the semiconductor manufacturing apparatus 14. The semiconductor manufacturing apparatus 14 performs the semiconductor manufacturing process treatment based on the control setting values input from the server apparatus 10.

Incidentally, the information processing system 1 illustrated in FIG. 1 is an example, and it is obvious that there are various system configuration examples depending on applications or purposes. The categorization of devices illustrated in FIG. 1, such as the server apparatus 10, the client apparatus 12, and the semiconductor manufacturing apparatus 14, is an example. Various configurations are possible, for example, a configuration in which at least two of the server apparatus 10, the client apparatus 12, and the semiconductor manufacturing apparatus 14 are integrated, a configuration in which the server apparatus 10 is divided, and the like.

Also, a configuration in which the semiconductor manufacturing apparatus 14 is not connected to the network 16 may be employed. In such a configuration, the semiconductor manufacturing apparatus 14 may receive an input of the control setting values that are output by the server apparatus 10, via a recording medium such as USB (Universal Serial Bus).

<Hardware Configuration>

Figure 2:
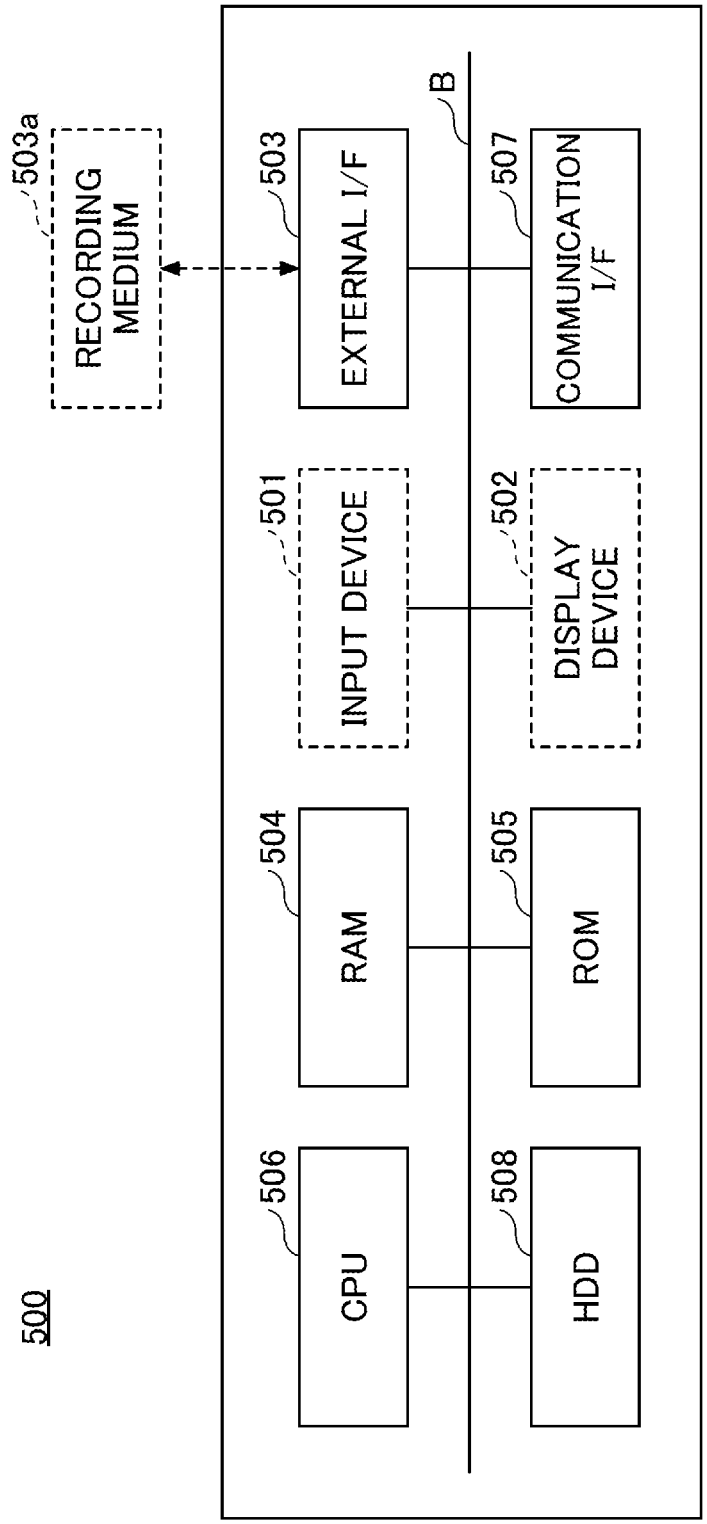
FIG. 2 is a hardware configuration diagram of an example of the computer.

The server apparatus 10 and the client apparatus 12 in the information processing system 1 of FIG. 1 are each implemented by a computer having a hardware configuration illustrated in, for example, FIG. 2. FIG. 2 is a hardware configuration diagram of an example of the computer.

The computer 500 of FIG. 2 includes an input device 501, a display device 502, an external I/F (interface) 503, a RAM (Random Access Memory) 504, a ROM (Read Only Memory) 505, a CPU (Central Processing Unit) 506, a communication I/F 507, and an HDD (Hard Disk Drive) 508, which are interconnected via a bus B. The input device 501 and the display device 502 may be connected and utilized when necessary.

The input device 501 may include a keyboard, a mouse, a touch panel, or the like, and is used by a user or the like to input operation signals. The display device 502 may be a display or the like, and displays results of processing by the computer 500. The communication I/F 507 is an interface that connects the computer 500 to a network. The HDD 508 is an example of a non-volatile memory device that stores programs and data.

The external I/F 503 is an interface with an external device. The computer 500 can read and/or write to a recording medium 503a, such as an SD (Secure Digital) memory card, via the external I/F 503. The ROM 505 is an example of a non-volatile semiconductor memory (memory device) in which programs and data are stored. The RAM 504 is an example of a volatile semiconductor memory (memory device) that temporarily retains programs and data.

The CPU 506 is an arithmetic device, which realizes overall control of the computer 500 and realizes functions, by loading the programs and data into the RAM 504 from the memory device such as the ROM 505 or the HDD 508, and by performing processing. The server apparatus 10 and the client apparatus 12 in the information processing system 1 of FIG. 1 can implement various functions to be described below, by the hardware configuration of the computer 500 of FIG. 2, for example.

<Functional Configuration>

Figure 3:
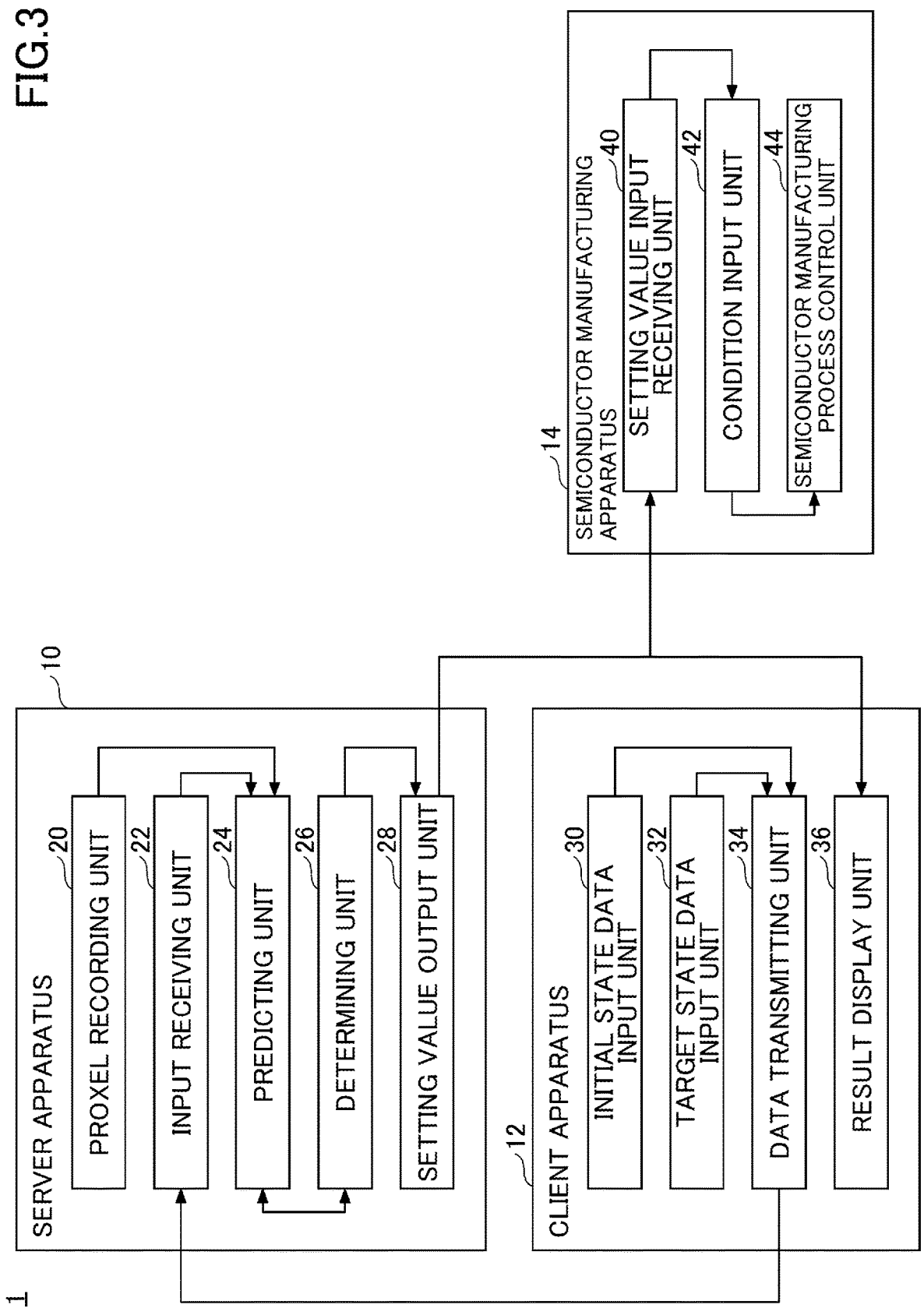
FIG. 3 is a functional block diagram illustrating an example of the information processing system according to the embodiment.

The information processing system 1 according to the present embodiment is realized by, for example, functional blocks illustrated in FIG. 3. FIG. 3 is a functional block diagram illustrating an example of the information processing system according to the present embodiment. In the functional blocks illustrated in FIG. 3, functional blocks that are not necessary for the description of the present embodiment are not illustrated.

The server apparatus 10 realizes a proxel recording unit 20, an input receiving unit 22, a predicting unit 24, a determining unit 26, and a setting value output unit 28, by executing a program for the server apparatus 10. The client apparatus 12 realizes an initial state data input unit 30, a target state data input unit 32, a data transmitting unit 34, and a result display unit 36, by executing a program for the client apparatus 12. The semiconductor manufacturing apparatus 14 implements a setting value input receiving unit 40, a condition input unit 42, and a semiconductor manufacturing process control unit 44, by executing a program for the semiconductor manufacturing apparatus 14.

The initial state data input unit 30 of the client apparatus 12 receives input of the initial state data from a user. The initial state data is data including three-dimensional structural information and material information of a workpiece prior to semiconductor manufacturing process treatment, which is modeled by, for example, shape modeling software. The initial state data may also be data including two-dimensional structural information and material information of a workpiece prior to semiconductor manufacturing process treatment. Further, the initial state data may be data including one-dimensional structural information and material information, if it is possible to represent structural information and material information of a workpiece prior to semiconductor manufacturing process treatment.

The target state data input unit 32 receives an input of the target state data from the user. The target state data is data including three-dimensional structural information and material information of a target workpiece after semiconductor manufacturing process treatment, which is modeled by, for example, shape modeling software. The target state data may be data including two-dimensional structural information and material information of the target workpiece after the semiconductor manufacturing process treatment. The target state data may be data including one-dimensional structural information and material information if it is possible to represent structural information and material information of a target workpiece after the semiconductor manufacturing process treatment.

The data transmitting unit 34 transmits, to the server apparatus 10, the initial state data received from the user by the initial state data input unit 30 and the target state data received from the user by the target state data input unit 32.

The result display unit 36 displays results of processing performed by the server apparatus 10. The result of the processing displayed by the result display unit 36 may be information representing an optimal solution of a model data element or a combination of multiple model data elements selected by the server apparatus 10, information representing control setting values corresponding to the model data element selected as the optimal solution, or information representing both. The result display unit 36 may display any number of the model data elements or the combination of multiple model data elements selected by the server apparatus 10, in a descending order of a degree of proximity.

The proxel recording unit 20 of the server apparatus 10 stores the various model data elements to be described below, each of which reproduces change of a workpiece and is constructed as an effect of semiconductor manufacturing process treatment. The input receiving unit 22 receives initial state data and target state data from the client apparatus 12.

The predicting unit 24 predicts end state data of a workpiece, by simulating a change of the initial state data of the workpiece caused by the semiconductor manufacturing process treatment, using the model data element or the combination of multiple model data elements stored in the proxel recording unit 20. The determining unit 26 identifies end state data of the workpiece that is close to the target state data of the workpiece, from among multiple pieces of end state data of the workpiece predicted by the predicting unit 24.

The determining unit 26 selects, as the optimal solution, the model data element or the combination of multiple model data elements that causes the workpiece to change to the identified end state data of the workpiece. The determining unit 26 determines the setting data included in the model data element selected as the optimal solution, as the control setting values. The setting value output unit 28 outputs the determined control setting values to at least one of the client apparatus 12 and the semiconductor manufacturing apparatus 14. The output by the setting value output unit 28 may include information indicating the optimal solution of the model data element or the combination of the multiple model data elements that is determined by the determining unit 26.

Alternatively, the determining unit 26 may select any number of the model data elements or any number of the combinations of the multiple model data elements, in a descending order of proximity, and may output the selected model data elements or the selected combinations of the multiple model data elements to the client apparatus 12. This allows the client apparatus 12 to display the model data elements or the combinations of the multiple model data elements by ranking, in the descending order.

The setting value input receiving unit 40 of the semiconductor manufacturing apparatus 14 receives an input of the control setting values from the server apparatus 10. The condition input unit 42 controls the semiconductor manufacturing process control unit 44 by inputting, as a condition, the control setting values inputted from the server apparatus 10. The semiconductor manufacturing process control unit 44 performs semiconductor manufacturing process treatment based on the input control setting values.

Data Example

Figure 4:
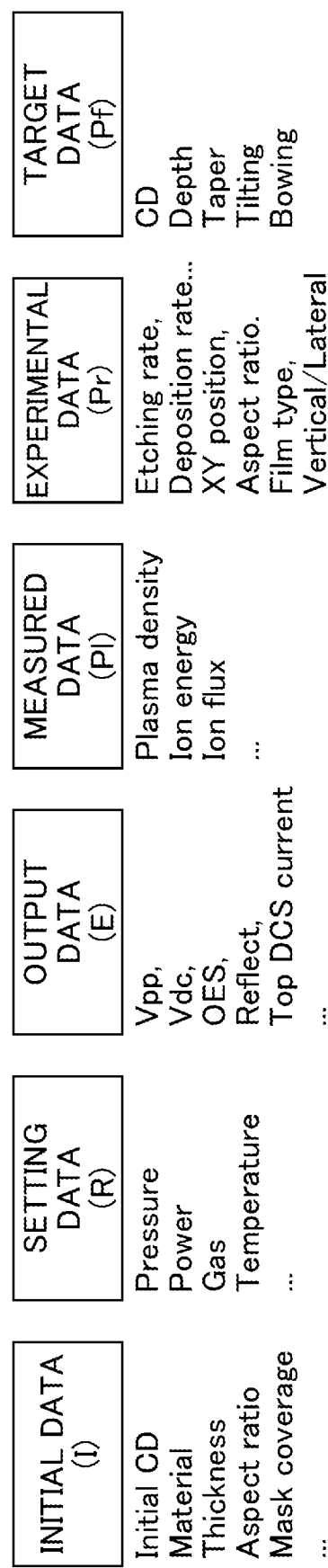
FIG. 4 is a block diagram illustrating an example of data related to semiconductor manufacturing process treatment.

Next, data examples related to semiconductor manufacturing process treatment will be described for ease of understanding of the present embodiment. FIG. 4 is a block diagram illustrating an example of data related to the semiconductor manufacturing process treatment. FIG. 4 illustrates initial data, setting data, output data, measured data, experimental data, and target data, as an example of data related to the semiconductor manufacturing process treatment.

The initial data of FIG. 4 is an example of the initial state data, and includes:
Initial CDs (critical dimensions)
Material
Thickness (thickness)
Aspect ratio
Mask coverage
Initial data may include three-dimensional structural information.

The setting data is an example of control setting values, and includes:
Pressure (pressure in the chamber)
Power (power of radio frequency power supply)

Gas (gas flow rate)

Temperature (temperature in the chamber or temperature on the surface of the substrate)

The output data is data output from the semiconductor manufacturing apparatus 14, and includes:

Vpp (potential difference)

Vdc (DC self-biasing voltage)

OES (light emission intensity by optical emission spectroscopy)

Reflect (power of reflected wave)

Measured data is data measured by measuring instruments, and includes:

Plasma Density

Ion energy

Ion flux (amount of incident ions)

Experimental data is data obtained by experiments, and includes:

Etching rate

Deposition rate

XY position (XY coordinate)

Film type

Vertical/Lateral (category of direction of reaction)

Target data is an example of target state data, and includes:

CD (critical dimension)

Depth

Taper (taper angle)

Tilting (tilt angle)

Bowing

The target data may include three-dimensional structural information.

As will be described below, the server apparatus 10 according to the present embodiment determines the optimal setting data by inputting the initial data and the target data.

<Overview of Model Data>

The model data element recorded by the proxel recording unit 20 of the server apparatus 10 is constructed by utilizing calculated effects with respect to various types of semiconductor manufacturing process treatment, as illustrated in FIG. 5. FIG. 5 is an explanatory diagram illustrating an example of a process for calculating an effect of the semiconductor manufacturing process treatment.

FIG. 5 illustrates that workpieces represented by the initial state data are changed to workpieces represented by the end state data, by performing a semiconductor manufacturing process in the semiconductor manufacturing apparatus 14 in which predetermined setting data is input as the control setting values. Then, the effect of the semiconductor manufacturing process can be expressed by a difference between the initial state data of the workpieces and the end state data of the workpieces. The execution status of the semiconductor manufacturing process at this time can be specified by the output data, the measured data, and the experimental data.

The proxel recording unit 20 of the server apparatus 10 records the model data element, which is the effect of the semiconductor manufacturing process calculated in the above-described manner that is associated with the setting data, the output data, the measured data, and the experimental data.

<Prediction Method for Change in Workpiece State Data>

FIGS. 6A and 6B are explanatory diagrams illustrating examples of methods for predicting change in state data of a workpiece. As illustrated in FIGS. 6A and 6B, there are two methods for predicting the state data change of the workpiece. One method is using the measured data, and the other method is using the experimental data.

FIG. 6A illustrates a method of predicting end data by using shape simulation software and measured data. In the method of FIG. 6A, measured data is required to predict change in state data of a workpiece. However, because the measured data is measured using measuring instruments, there is a problem that an error of a measurement system is included.

FIG. 6B illustrates a method of predicting end data by using shape modeling software and experimental data. In the method of FIG. 6B, experimental data is required to predict change in state data of a workpiece. That is, in the method of FIG. 6B, the shape modeling software predicts change in state data of the workpiece by using experimental data acquired in the past.

In the present embodiment, the method illustrated in FIG. 6B is employed in which improving accuracy of prediction of change in state data of a workpiece is not required. In the method of FIG. 6B, the model data element reproduces change of the workpiece from an initial state to an end state that occurs by performing the semiconductor manufacturing process. However, if the model data element according to the present embodiment can be generated, the method of FIG. 6A may be employed.

<Process>

<<Process in Server Apparatus>>

FIG. 7 is a flowchart illustrating an example of a process performed in the server apparatus. At step S11, the input receiving unit 22 of the server apparatus 10 receives the initial state data and the target state data from the client apparatus 12. Next, the process proceeds to step S12, and the predicting unit 24 reads out a model data element or a combination of multiple model data elements to be used, from the proxel recording unit 20. The readout of the model data element or the combination of the multiple model data elements to be used may be performed by a brute-force approach, may be performed randomly for a predetermined number of times, or may be performed until the proximity reaches an acceptable value.

Figure 8A:
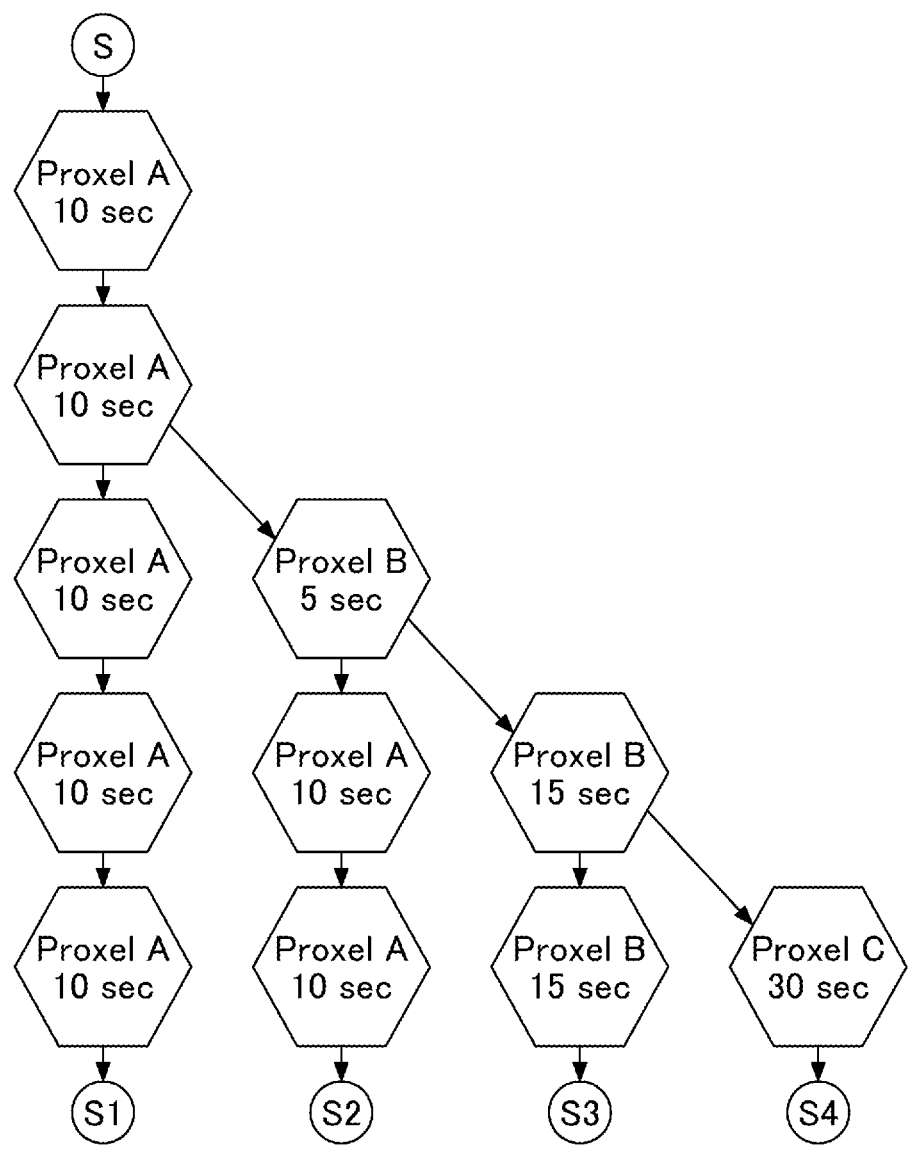
FIG. 8A is a schematic diagram illustrating an example of a process of reading out combinations of multiple model data elements.
Figure 8B:
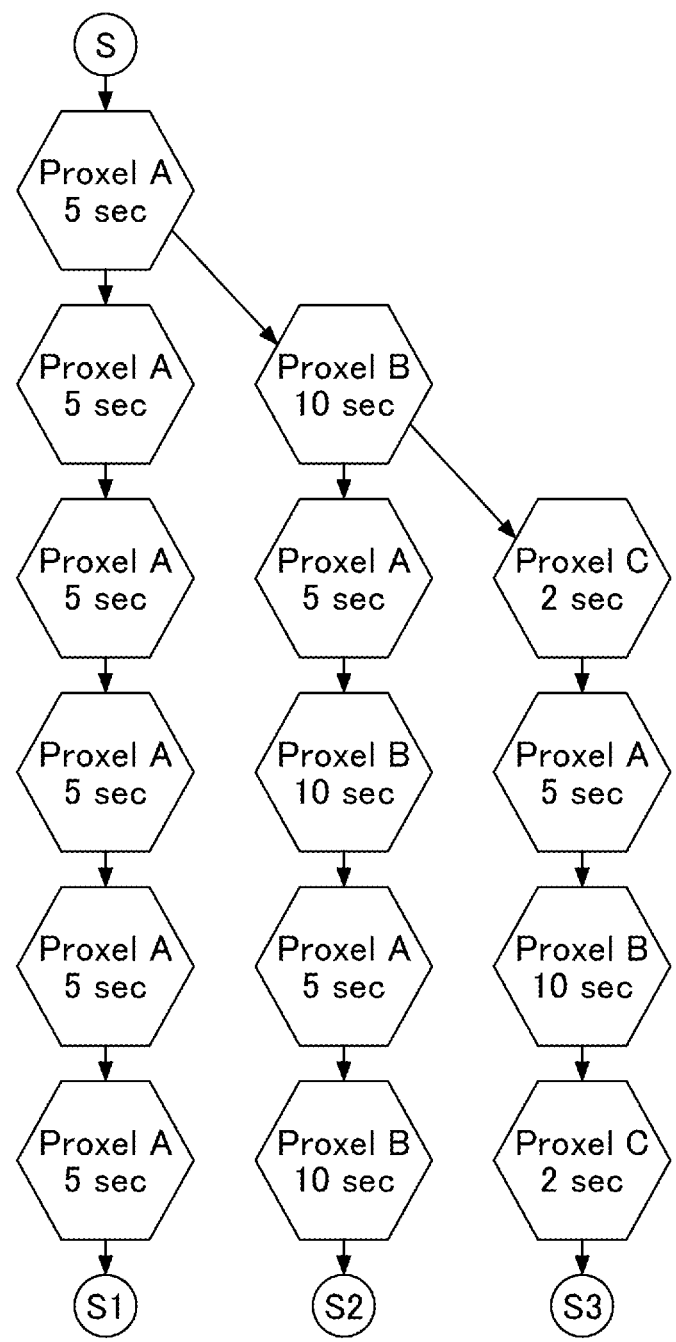
FIG. 8B is a schematic diagram illustrating an example of a process of reading out combinations of multiple model data elements.

FIGS. 8A and 8B are schematic diagrams each illustrating an example of a process of reading out combinations of multiple model data elements. In FIGS. 8A and 8B, model data is denoted by "Proxel". FIG. 8A is an example in which each combination consists of five model data elements. FIG. 8B is an example in which each combination consists of six model data elements. As illustrated in FIGS. 8A and 8B, a combination of the multiple model data elements may include multiple pieces of the same model data element.

Figure 9:
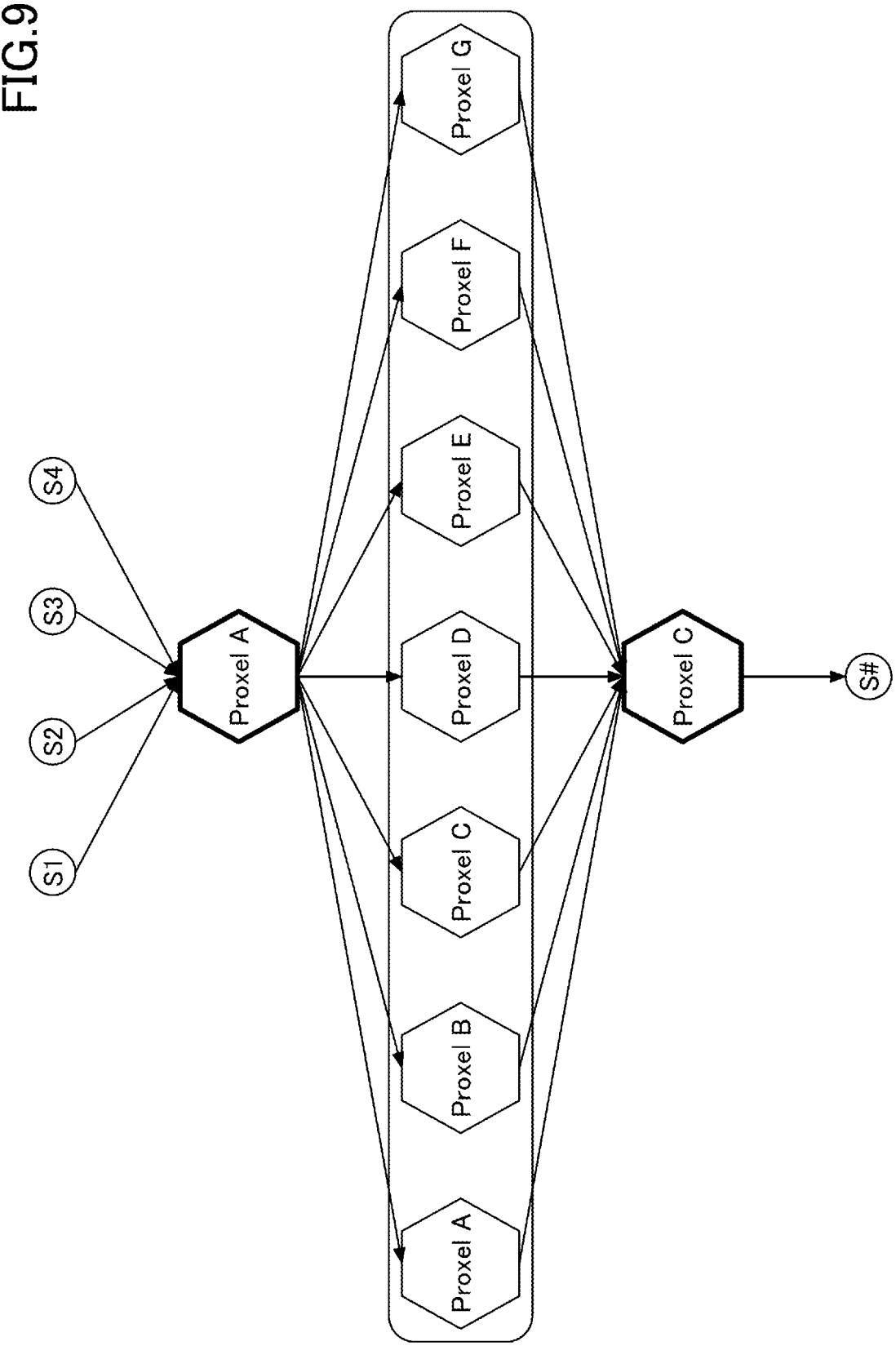
FIG. 9 is a schematic diagram illustrating an example of a process of reading out combinations of multiple model data elements.

Further, the process of reading out a combination of multiple model data elements may be performed as illustrated in FIG. 9. FIG. 9 is a schematic diagram illustrating an example of the process of reading out a combination of multiple model data elements. FIG. 9 is an example of a case of reading out combinations each consisting of three model data elements, in which the first model data "Proxel A" and the third model data "Proxel C" are directly designated by the user. In the example of FIG. 9, different combinations of multiple model data elements are read by inserting or switching the second model data element.

The process proceeds to step S13. At step S13, the predicting unit 24 predicts the end state data of the workpiece, by simulating a change of the initial state data of the workpiece by the semiconductor manufacturing process treatment using the model data element or the combination of the multiple model data elements that is/are read out from the proxel recording unit 20 at step S12.

Figure 10:
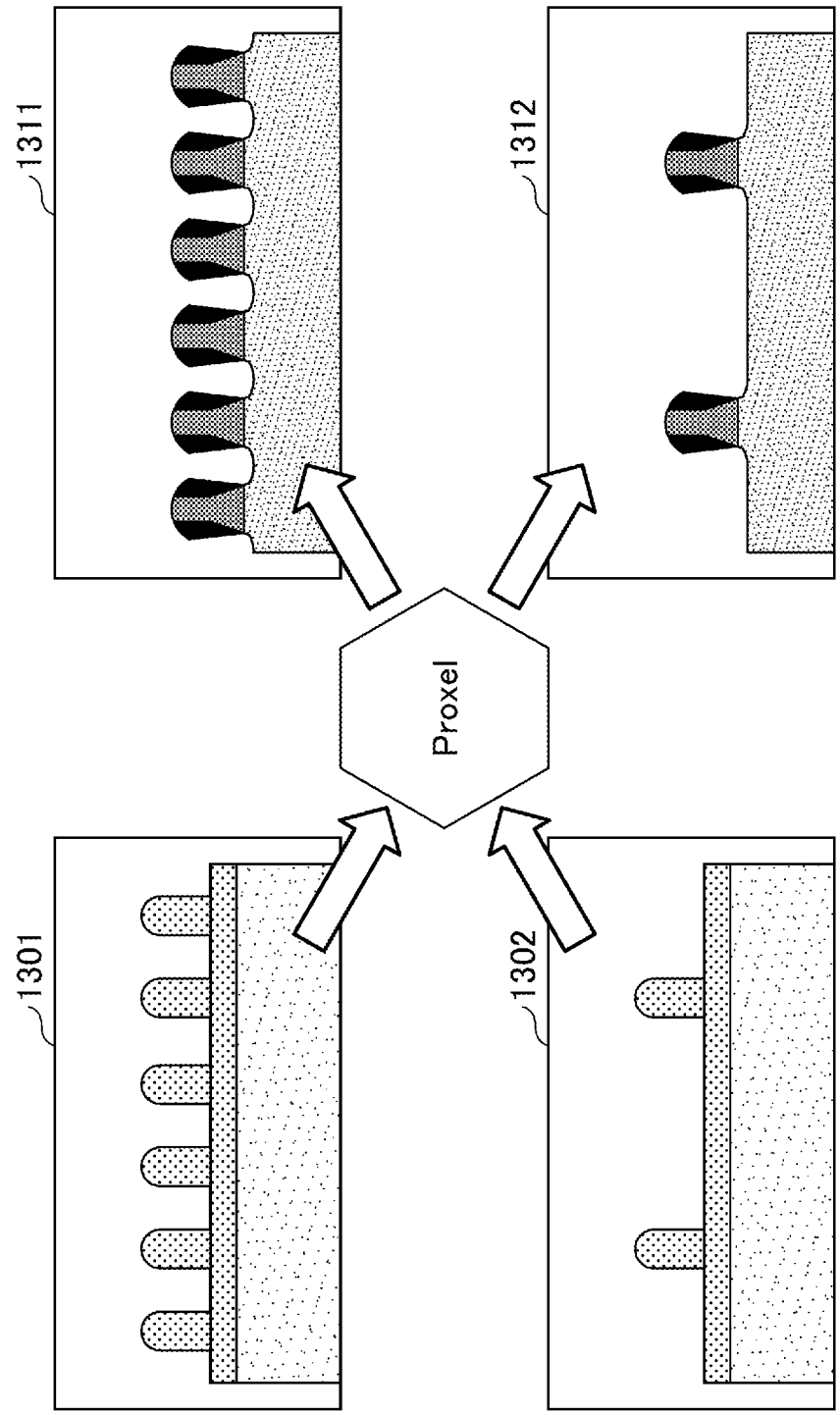
FIG. 10 is a schematic diagram of an example of a prediction process.

For example, in a case in which a single model data element is read out at step S12, as illustrated in FIG. 10, the single model data element is used to predict the end state data of the workpiece from the initial state data. FIG. 10 is a schematic diagram of an example of a prediction process. Because the model data element is associated with the effect of a predetermined semiconductor manufacturing process, a workpiece 1311 of end state data when a workpiece 1301 of initial state data is input can be predicted. Similarly, a workpiece 1312 of end state data when a workpiece 1302 of initial state data is input can be predicted. As described above, if there are multiple initial state data each representing, for example, a different shape, different end state data according to each initial state data can be predicted, by using the model data element according to the present embodiment.

In a case in which a combination of multiple model data elements is read at step S12, the end state data of the workpiece is predicted from the initial state data of the workpiece by using the multiple model data elements sequentially from the beginning. As the initial state data of the second model data element, the end state data generated by the model data element just before the second model data element is used. Similarly, as the initial state data of a model data element that is subsequent to the second model data element, the end state data generated by a model data element just before said model data element is used. As described above, the predicting unit 24 predicts the end state data of the workpiece using the model data element or the combination of multiple model data elements that is/are read out of the proxel recording unit 20 in step S12.

The process proceeds to step S14. At step S14, the determining unit 26 calculates a degree of proximity (or a degree of deviation) between the end state data of the workpiece predicted by the predicting unit 24 at step S13 and the target state data received at step S11.

The process proceeds to step S15. The predicting unit 24 and the determining unit 26 repeat steps S12 to S15 until the reading of all model data elements and all combinations of multiple model data element is completed. After the predicting unit 24 and the determining unit 26 complete reading out of the all model data elements and the all combinations of multiple model data element, the process proceeds to step S16. At step S16, the model data element or the combination of multiple model data elements having the largest proximity (or the smallest deviation) calculated at step S14 can be selected as the optimal solution.

In a case in which the readout of the combination of the multiple model data elements is to be performed randomly for a predetermined number of times, the repeated execution of steps S12 to S15 is performed until the number of the readouts reaches the predetermined number. In a case in which the readout of the combination of the multiple model data elements is to be performed until the proximity reaches an acceptable value, the repeated execution of steps S12 to S15 is performed until the acceptable proximity is calculated.

In the process described in the flow chart of FIG. 7, as the number of model data elements recorded in the proxel recording unit 20 of the server apparatus 10 increases, the number of model data elements or the number of combinations of multiple model data elements that are to be read out in step S12 increases, and time required for selecting the optimal solution becomes longer. Accordingly, the process performed at step S12, which reads out, from the proxel recording unit 20, model data elements or combinations of multiple model data elements to be used, may be configured to improve efficiency of search for the optimal solution, by machine learning using the difference calculated in step S14 as an evaluation value. Tree search, graph search, meta-heuristics, or a combination of these may be used for searching for the optimal solution. Additionally, in order to search for the optimal solution, reinforcement learning may be used to learn the policy of selecting a semiconductor manufacturing process for obtaining end state data close to the target state data.

For example, a method of searching for an optimal solution using a genetic algorithm based on results of step S14 in FIG. 7 may be performed, or search (reinforcement learning) may be performed by using the degree of deviation from the target state data as reward criterion. Alternatively, by learning a relationship between a difference from the target state data and a process condition of the semiconductor manufacturing process treatment, search (reinforcement learning) may be performed by using the degree of deviation from the target state data as a reward criterion.

<Proxel>

As the model data element recorded by the proxel recording unit 20 of the server apparatus 10, for example, the following proxel may be used. The proxel is a minimum data unit (process element) in process treatment applied to a workpiece, and designation of the proxel is similar to the designation of a minimum unit (Picture Element) of an image, which is referred to as a "pixel", or the designation of a minimum unit (Volume Element) of a solid, which is referred to as a "voxel".

The proxel is defined as a minimum unit of process conditions, under which an effect (change in state data) of semiconductor manufacturing process treatment applied to a workpiece is uniquely determined in the process condition space. With respect to the model data element according to the present embodiment, if it is known that use of multiple proxels brings about a certain effect, the multiple proxels may be treated collectively.

Other Embodiments

In the first embodiment, an example of specifying a single initial state data piece and a single target state data piece has been described. However, multiple initial state data pieces and multiple target state data pieces may be specified, and proximities of the respective data may be used as indicators, so as to deal with the loading effect or to aim at in-plane uniformity.

For an objective of loading effect or in-plane uniformity, the initial state data and the target state data need to be specified for every different pattern profile, or for every different section (center/middle/edge, etc.) of a substrate. For an objective of loading effect or in-plane uniformity, multiple proximities are used as indicators from among the obtained proximities.

In the first embodiment, the determining unit 26 selects, as the optimal solution, a model data element or a combination of multiple model data elements having the largest proximity (or the smallest deviation) calculated at step S14, but may accept judgment or an operation by a person. For example, the determining unit 26 may output multiple process condition candidates based on the proximity, and may receive judgment or an operation by a person for finally narrowing down the process condition from the multiple process conditions candidates.

In a case in which a judgment criterion specified by a user (human judgment) is stored in advance, the determining unit 26 includes a function to finally determine the process condition from the multiple process condition candidates based on the judgment criterion specified in advance by a user. Meanwhile, in a case in which a selection operation by a user (human operation) is received, the determining unit 26 includes a function for displaying the multiple process condition candidates on the client apparatus 12, and for receiving, from a user, final selection of the process condition.

SUMMARY

Figure 11:
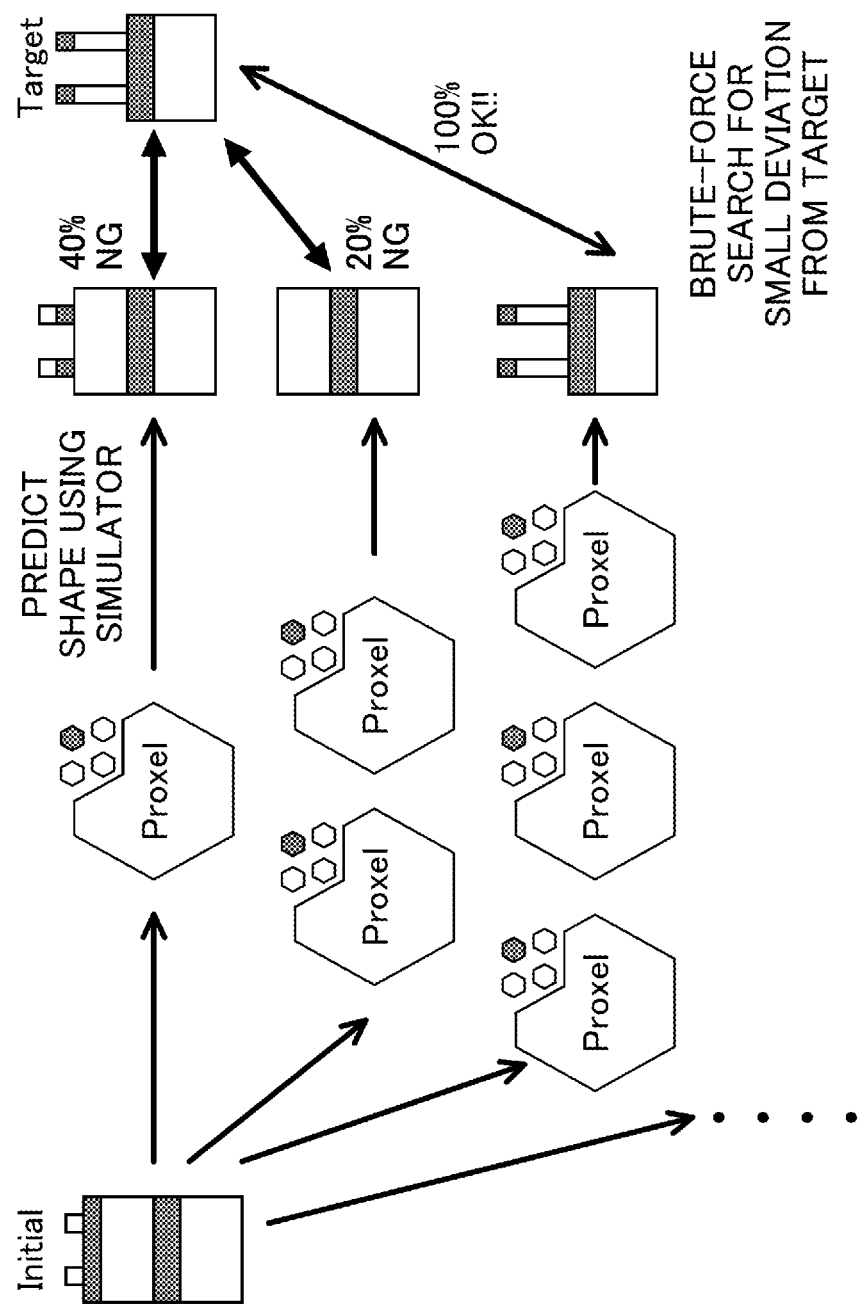
FIG. 11 is a schematic diagram illustrating an example of the process performed in the server apparatus 10 according to the embodiment.

As described above, according to the present embodiment, based on the input of the initial state data and the target state data such as the structural information of the workpiece, the optimal model data element or the optimal combination of the model data elements can be automatically retrieved from the accumulated model data elements, and the candidate of the process condition such as the control setting values input to the semiconductor manufacturing apparatus 14 can be proposed to a user. FIG. 11 is a schematic diagram illustrating an example of the process performed in the server apparatus 10 according to the present embodiment.

Further, according to the present embodiment, by inputting data including material information of a workpiece and three-dimensional structural information of the workpiece before and after the semiconductor manufacturing process treatment that is modeled by, for example, shape modeling software, amount of information input by a user increases, and shape processing and surface treatment approximating to the target state data can be realized with greater accuracy. In the present embodiment, the shape of the workpiece may include an arrangement of a micro area (e.g., arrangement of atoms) or a state (e.g., reaction with a gas).

The present invention is not limited to the above disclosed embodiments, and various modifications and variations are possible without departing from the scope of the claims. Needless to say, the information processing system 1 described in the present embodiment is an example, and there are various system configuration examples depending on applications and purposes.

What is claimed is:

1. A processor-implemented information processing method comprising:
   receiving a plurality of model data elements which are stored in a memory and each of which reproduces a change in state data of a workpiece, each of the model data elements being constructed, as an effect of a minimum unit of process treatment, from differential data between initial state data of a plurality of workpieces and end state data of the plurality of workpieces, the end state data of the plurality of workpieces being the state data of the plurality of workpieces to which the minimum unit of the process treatment is applied under a predetermined process condition;
   receiving an input of the initial state data of an objective workpiece and target end state data of the objective workpiece;
   predicting, for a plurality of combinations of the plurality of model data elements, end state data of the objective workpiece from the initial state data of the objective workpiece received, by using a corresponding combination of the plurality of combinations of the plurality of model data elements;
   selecting a combination of the plurality of model data elements based on a proximity between the predicted end state data of the objective workpiece and the target end state data of the objective workpiece received; and
   determining a process condition of process treatment to be applied to the objective workpiece, based on the selected combination of the plurality of model data elements.

2. The processor-implemented information processing method as claimed in claim 1, wherein
   the initial state data of the objective workpiece includes a plurality of initial state data pieces of the objective workpiece;
   the target end state data of the objective workpiece includes a plurality of target end state data pieces of the objective workpiece; and
   the combination of the plurality of model data elements is selected based on a plurality of proximities between the predicted end state data of the objective workpiece and the plurality of the target end state data pieces of the objective workpiece.

3. The processor-implemented information processing method as claimed in claim 1, wherein
   the state data of the workpiece includes structural information of the workpiece and material information of the workpiece, and
   each of the model data elements reproduces a change in the structural information of the workpiece and a change in the material information of the workpiece.

4. The processor-implemented information processing method as claimed in claim 1, wherein the process condition includes a setting value for a control component in a process treatment executing device that applies the minimum unit of the process treatment to the workpiece.

5. The processor-implemented information processing method as claimed in claim 4, wherein
   the determined process condition of the process treatment to be applied to the objective workpiece includes the setting value for the control component in the process treatment executing device, and
   the processor-implemented information processing method further includes outputting the setting value for the control component in the process treatment executing device, based on the determined process condition of the process treatment to be applied to the objective workpiece.

6. The processor-implemented information processing method as claimed in claim 1, wherein, in the receiving of the input,
   the initial state data of the objective workpiece and the target end state data of the objective workpiece that are output from software capable of designing at least a shape of the objective workpiece are received.

7. The processor-implemented information processing method as claimed in claim 1, wherein
   the predicting includes predicting, for every combination of the plurality of model data elements recorded, the end state data of the objective workpiece from the initial state data of the objective workpiece received; and
   the combination of the plurality of model data elements is selected based on the predicted end state data of the objective workpiece having a largest proximity to the target end state data of the objective workpiece.

8. The processor-implemented information processing method as claimed in claim 1, wherein
   the predicting includes searching for an optimal solution from among the combinations of the plurality of model data elements recorded, by machine learning using, as an evaluation value, a difference between the predicted end state data of the objective workpiece and the target end state data of the objective workpiece.

9. The processor-implemented information processing method as claimed in claim 1, wherein
the selecting includes determining a plurality of process condition candidates based on the proximity, and
the combination of the plurality of model data elements is selected from among the plurality of process condition candidates, based on a judgement criterion specified and stored by a user in advance.

10. The processor-implemented information processing method as claimed in claim 1, wherein
the selecting includes
determining a plurality of process condition candidates based on the proximity;
providing a user with the plurality of process condition candidates;
receiving, from the user, a selection of a process condition from among the plurality of process condition candidates; and
selecting the combination of the plurality of model data elements based on the selection of the process condition.

11. The processor-implemented information processing method as claimed in claim 1, wherein the process treatment is semiconductor manufacturing process treatment.

12. A non-transitory recording medium having a program embodied therein for causing a processor to perform:

receiving a plurality of model data elements which are stored in a memory and each of which reproduces a change in state data of a workpiece, each of the model data elements being constructed, as an effect of a minimum unit of process treatment, from differential data between initial state data of a plurality of workpieces and end state data of the plurality of workpieces, the end state data of the plurality of workpieces being the state data of the plurality of workpieces to which the minimum unit of the process treatment is applied under a predetermined process condition;

receiving an input of the initial state data of an objective workpiece and target end state data of the objective workpiece;

predicting, for a plurality of combinations of the plurality of model data elements, end state data of the objective workpiece from the initial state data of the objective workpiece received, by using a corresponding combination of the plurality of combinations of the plurality of model data elements;

selecting a combination of the plurality of model data elements based on a proximity between the predicted end state data of the objective workpiece and the target end state data of the objective workpiece received; and determining a process condition of process treatment to be applied to the objective workpiece, based on the selected combination of the plurality of model data elements.

* * * * *